United States Patent Office 3,689,248
Patented Sept. 5, 1972

3,689,248
METHOD OF PROCESSING COPPER-CONTAINING MATERIALS TO RECOVER METALLIC COPPER AND/OR COPPER CHLORIDE
Charles W. Mehl, Redlands, Calif., assignor to Mehl Chemical Corporation, Riverside, Calif.
No Drawing. Filed May 24, 1971, Ser. No. 146,451
Int. Cl. C22b 3/00, 15/08; C01g 3/04
U.S. Cl. 75—1                                              6 Claims

ABSTRACT OF THE DISCLOSURE

A method of producing 99% pure copper from copper-based alloy scrap, or copper chloride from copper-bearing ore, by an ion-exchange process comprising the steps of: reacting magnetically extracted black sand with concentrated HCl to produce an amber-colored colloidal solution consisting essentially of oxy-chlorides of all elements in the black sand, with pH of 1.0 and a marked Brownian movement; and then reacting said solution with copper-based alloy scrap to produce 99% pure copper; or reacting said solution with crushed copper ore of not less than about 1% copper content, to produce copper chloride solution. The Brownian movement of the solution causes the molecules of alloying metals in the scrap brass or bronze to dissolve out, leaving 99% pure copper behind. In the case of ore, the Brownian movement causes the various elements to break down by ion-exchange, leaving copper chloride in solution.

BACKGROUND OF THE INVENTION

The present invention relates to a method of producing 99% pure copper from copper-based alloy scrap, or copper chloride from copper-bearing ore by an ion-exchange process.

The conventional method of extracting copper values from oxidized copper ore, mixed oxide-sulfide ores, and sulfide ores, is to react the ore with sulfuric acid, then leach out the resultant copper sulfate, and precipitate out the copper from the pregnant solution with metallic iron in the form of shredded scrap cans. The chief disadvantage of this process is that it requires about 2 pounds of iron for every pound of copper produced, which is a considerable item of expense, and moreover it produces large quantities of ferrous sulfate which must be disposed of. A further factor is that a large quantity of sulfuric acid is required, which is not recovered in the process.

SUMMARY OF THE INVENTION

The primary object of the invention is to provide a new and improved ion-exchange method of processing copper-containing materials to recover metallic copper and/or copper chloride.

More specifically, one object of the invention is to provide a new and improved process for recovering 99% pure copper from brass or bronze scrap, or any scrap metal containing appreciable amounts of copper.

Another object of the invention is to provide an improved process for treating certain copper-bearing ores such as azurite, malachite, cuprite, tenorite, chalcocite, covillite, chalcopyrite, to recover copper chloride, which can then be processed to recover metallic copper from the solution.

These objects are achieved in the present invention by reacting concentrated hydrochloric acid with magnetically extracted black sand to produce an amber-colored colloidal solution consisting essentially of oxy-chlorides of all elements in the black sand, with a pH of 1.0 and a marked Brownian movement. This solution is then reacted with crushed copper ore of not less than about 1% copper content to produce copper chloride solution. Alternatively, the solution may be reacted with copper-bearing scrap metal, in which case the solution dissolves out all of the alloying metals, leaving 99% pure copper behind.

The foregoing and other objects and advantages of the invention will become apparent to those skilled in the art from the following detailed description.

DESCRIPTION OF THE PREFERRED EMBODIMENT

In this invention, a colloidal solution is prepared by reacting magnetically extracted black sand with concentrated hydrochloric acid. The term "black sand" as used herein refers to a granular, black-colored mineral consisting of a mixture of approximately 40 elements, including ilmenite, rutile, magnetite, zircon, and other minerals or impurities that are picked up by a magnet. Ilmenite is an iron-black mineral composed of iron, titanium, and oxygen; rutile is a reddish-brown mineral consisting of titanium dioxide ($TiO_2$) and usually containing a little iron; magnetite is an iron oxide ($Fe_3O_4$) sometimes possessing polarity, in which case it is called loadstone; and zircon is a silicate of zirconium ($ZrSiO_4$), a tetragonal mineral occurring usually in square brown or grayish prisms or pyramids. Black sand is found in many countries throughout the world, and is widely distributed in the southwestern States of the United States. It is magnetically extracted from the crushed ore, using a powerful electromagnet. While magnetically extracted black sand may vary from place to place in its constituents and their proportions, any magnetically extracted black sand will work.

The first step in the process of the invention is to react black sand with concentrated hydrochloric acid (HCl) to produce the working solution used in the second step. By way of example, 1 gallon of concentrated HCl may be mixed with 1 lb. of black sand, and the mixture allowed to stand for ¼ to 1 hour. The reaction is somewhat exothermic, and the solution becomes quite warm—for example, warming from 75° F. to 125° F. If the mixture should show any tendency to go above 125° F. steps should be taken to cool it, as the volatile products of the hydrochloric acid will otherwise escape and be lost.

At the end of the reaction period, the solution is decanted from the mixture. The solution is amber-colored, with a pH of 1.0, and has a marked colloidal (Brownian) movement. It consists essentially of oxy-chlorides of all of the elements in the black sand, but primarily oxy-chlorides of iron, titanium, and zirconium.

The second step in the process of the invention is to react copper-bearing ore, or copper-based alloy scrap, with the working solution just described. The first to be described is the reaction of the solution with various oxide, carbonate, and sulfide ores of copper. The most common oxide ores are cuprite ($Cu_2O$) and tenorite ($CuO$); the most common carbonate ores are azurite

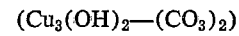

$$(Cu_3(OH)_2—(CO_3)_2)$$

which is a blue basic carbonate of copper, and malachite ($Cu_2(OH)_2$—$CO_3$) which is a green basic carbonate of copper; and the common sulfide ores are chalcocite ($Cu_2S$), covellite ($CuS$), and chalcopyrite ($CuFeS_2$). From the standpoint of economics, it is necessary that the ore contain at least 1% of combined copper. If the copper content is less than 1%, the ore can be concentrated by any of several known processes.

To each ton of crushed ore, 5 gallons of the above-described working solution is added. The mixture of ore and solution is allowed to stand for at least 8 hours, and the ore is then flooded with water and leached for 16 hours. During the reaction, the Brownian movement of the solution causes the various elements in the ore to break down by ion-exchange, with the result that the copper ions in the ore combine with the chlorine ions of the solution to form copper chloride. The pregnant leach liquor also contains chlorides of other elements such as Al, Na, K, and others, which can be recovered.

The leach liquor is then heated in a retort to volatilize the free hydrochloric acid so that the acid can be reclaimed and used again, and also to dry the copper chloride for storage and/or transport to the copper-precipitation plant.

While it would appear that the same reaction might be obtained by merely reacting concentrated hydrochloric acid wtih crushed ore, I have found that this is not the case. Apparently, there is a complex ion-exchange reaction between the oxy-chlorides of the solution and the ions of the ore which, together with the Brownian movement of the solution, hastens the reaction of the free hydrochloric acid in the solution with the various ore elements and causes the copper to be selectively dissolved out in the form of copper chloride.

To reclaim 99% pure copper from scrap copper-based alloy such as brass, bronze, beryllium copper, and the like, the scrap metal is immersed in a bath of the working solution for a period of from 8 to 24 hours, after which the metal is removed and rinsed clean. The metal that remains is 99% pure copper, and appears to be in the form of tiny crystals of metal surrounded by open pores. What has happened is that the matrix of other alloying metals has been attacked by the solution and dissolved out, leaving only the copper behind.

The reaction of the working solution with the copper-based alloys is exothermic and, in fact, highly exothermic in the case of aluminum-containing brass or bronze. The exothermic activity varies with the constituents of the alloys, and in some cases it may be necessary to provide means for cooling the solution during the reaction period. The solution attacks the Zn and Al and other elements, forming chlorides of these metals, and leaving the metallic copper relatively unaffected. Here again, ion-exchange of oxy-chlorides together with the Brownian movement of the solution hastens the reaction of the free hydrochloric acid with the alloy elements. The iron in solution will not be displaced by copper, and this has the effect of inhibiting the action of the acid on the copper.

Hydrochloric acid is the only economically feasible acid to be used in this process. Sulfuric acid will not work as fast, and makes a complex, impure product. Moreover, sulfuric acid cannot be economically reclaimed, whereas hydrochloric acid is easily reclaimed. Nitric acid dissolves the entire alloy, and leaves a mixture of nitrates. All other acids are too expensive to be economically feasible. Some acids, such as hydrocyanic acid (HCN), are extremely dangerous to work with because of their poisonous character.

For the working solution, there is nothing else known to applicant that can be substituted for the reaction product obtained by reacting concentrated hydrochloric acid with magnetically extracted black sand. The exact ingredient, or combination of ingredients, in this working solution which is responsible for its effectiveness is not known with certainty, but it appears to be the combination of a mixture of oxy-chlorides of iron, titanium, silicon and zirconium, with a certain amount of free hydrochloric acid.

I claim:
1. The method of recovering copper values from copper-bearing substances, comprising the steps of:
  (a) reacting a quantity of concentrated hydrochloric acid with magnetically extracted black sand for a period of time sufficient to produce a colloidal solution containing substantial amounts of oxy-chlorides of the elements in said black sand, a pH of about 1.0, and a marked Brownian movement;
  (b) reacting said colloidal solution with said copper-bearing substances for a period of time to procure effective results, the oxy-chlorides of said solution reacting by ion-exchange with the ingredients of said copper-bearing substances to separate the copper from the other ingredients, and the reaction being hastened by the Brownian movement of the solution; and
  (c) separating the copper values from said solution.
2. The method of claim 1, in which said copper-bearing substances consists of copper-based alloy metal scraps, and including the following steps;
  (a) immersing the metal scrap in said solution until all of the alloying metals have been dissolved out in the form of chlorides, leaving relatively pure copper behind; and
  (b) removing said copper residue from said solution and rinsing it clean with water.
3. The method of claim 1, in which said copper-bearing substance consists of copper ore, and including the following steps:
  (a) wetting crushed ore with said solution and allowing it to stand for a period of time sufficient to react with the ore ingredients;
  (b) flooding the said reacted ore with water;
  (c) leaching the resulting solution from said ore; and
  (d) reclaming the hydrochloric acid from the leach liquor.
4. The method of claim 3 in which the amount of solution added to the ore is at the rate of approximately 5 gallons per ton of ore; and the length of time that the solution is allowed to react with the ore is at least 8 hours.
5. The method of claim 4, in which the leaching liquor step is carried out for at least 16 hours.
6. The method of claim 1, in which the amount of concentrated hydrochloric acid that is reacted with said black sand is approximately 1 gallon of acid to 1 lb. of black sand; and the reaction time is from ¼ to 1 hour.

References Cited

UNITED STATES PATENTS

| 957,231 | 5/1910 | Maschmeyer | 75—72 |
| 3,127,264 | 3/1964 | Tschirner et al. | 75—117 X |
| 3,260,593 | 7/1966 | Zimmerley et al. | 75—104 X |
| 3,353,950 | 11/1967 | Junghanss | 75—117 X |

FOREIGN PATENTS

| 2,182 | 1881 | Great Britain | 75—3 |

ALLEN B. CURTIS, Primary Examiner

U.S. Cl. X.R.

23—55; 75—72, 104, 117